US011889518B2

(12) United States Patent
Akkarakaran et al.

(10) Patent No.: US 11,889,518 B2
(45) Date of Patent: Jan. 30, 2024

(54) TECHNIQUES FOR SIDELINK CARRIER AGGREGATION (CA) AND CROSS-CARRIER SCHEDULING INDICATION IN SIDELINK CONTROL INFORMATION (SCI)

(71) Applicant: QUALCOMM Incorporated, San Diego, CA (US)

(72) Inventors: Sony Akkarakaran, Poway, CA (US); Jung Ho Ryu, Fort Lee, NJ (US); Tao Luo, San Diego, CA (US); Junyi Li, Fairless Hills, PA (US); Jing Sun, San Diego, CA (US); Xiaoxia Zhang, San Diego, CA (US); Juan Montojo, San Diego, CA (US); Peter Gaal, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 17/378,461

(22) Filed: Jul. 16, 2021

(65) Prior Publication Data
US 2022/0053548 A1     Feb. 17, 2022

Related U.S. Application Data

(60) Provisional application No. 63/065,962, filed on Aug. 14, 2020.

(51) Int. Cl.
*H04W 72/00* (2023.01)
*H04W 72/23* (2023.01)
(Continued)

(52) U.S. Cl.
CPC ........... *H04W 72/23* (2023.01); *H04W 28/26* (2013.01); *H04W 72/0453* (2013.01); *H04W 72/1263* (2013.01); *H04W 72/20* (2023.01)

(58) Field of Classification Search
None
See application file for complete search history.

(56) References Cited

U.S. PATENT DOCUMENTS

| | | | |
|---|---|---|---|
| 2021/0153262 A1* | 5/2021 | Mochizuki | H04W 56/0045 |
| 2021/0160037 A1* | 5/2021 | Ji | H04W 72/02 |
| 2022/0150908 A1* | 5/2022 | Ji | H04L 5/0055 |

FOREIGN PATENT DOCUMENTS

| | | |
|---|---|---|
| EP | 3832937 A1 | 6/2021 |
| WO | 2018175842 A1 | 9/2018 |
| WO | 2020029875 A1 | 2/2020 |

OTHER PUBLICATIONS

International Search Report and Written Opinion—PCT/US2021/042236—ISA/EPO—dated Nov. 5, 2021.

\* cited by examiner

*Primary Examiner* — Abdelillah Elmejjarmi
(74) *Attorney, Agent, or Firm* — Arent Fox, LLP

(57) ABSTRACT

This disclosure relates to sidelink carrier aggregation and cross-carrier scheduling indications in sidelink control information (SCI). Specifically, in one aspect, a transmit UE may configure a multi-component carrier grant including a plurality of component carriers for a physical sidelink share channel (PSSCH). The transmit UE may further transmit, one or both of a set of first SCI each including a single component carrier grant corresponding to one component carrier from the multi-component carrier grant and associated with scheduling information of the one component carrier, or a second SCI including the multi-component carrier grant and associated with scheduling information of the plurality of component carriers. In another aspect, a receiver UE may receive one or both of the set of first SCI each including the single component carrier grant corresponding to one component carrier from the multi-compo- (Continued)

nent carrier grant, or the second SCI including the multi-component carrier grant.

30 Claims, 11 Drawing Sheets

(51) Int. Cl.
*H04W 72/1263* (2023.01)
*H04W 28/26* (2009.01)
*H04W 72/0453* (2023.01)
*H04W 72/20* (2023.01)

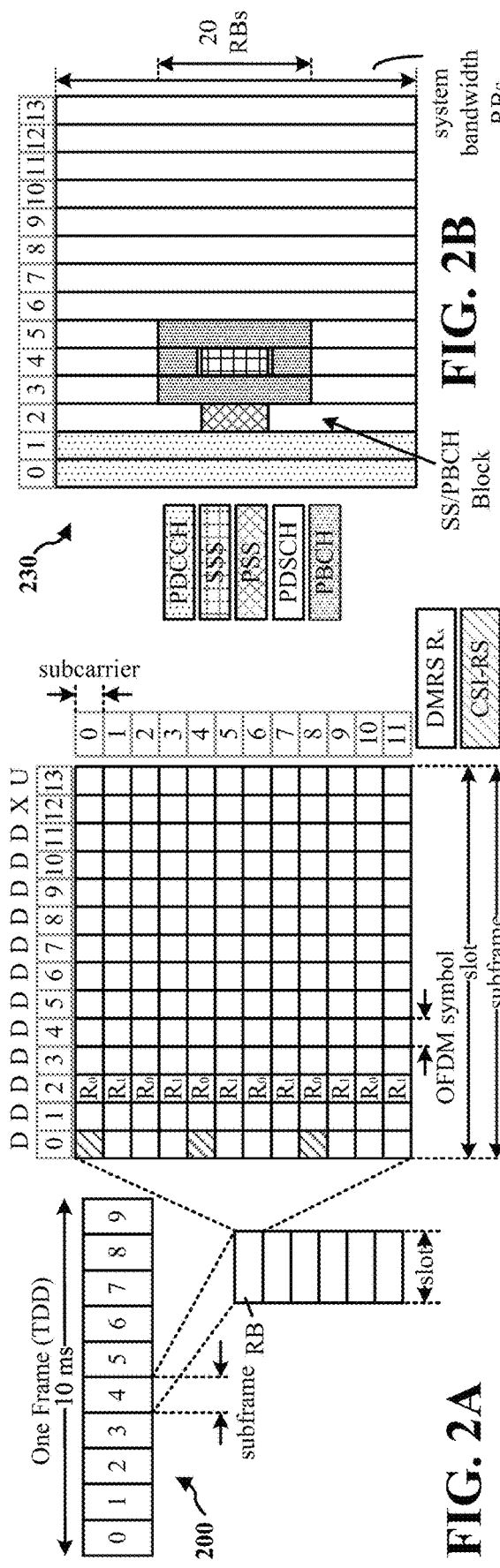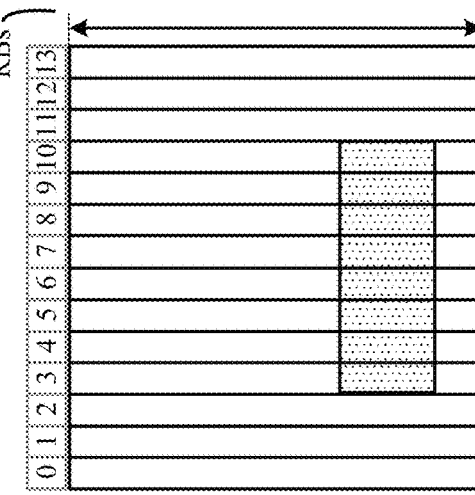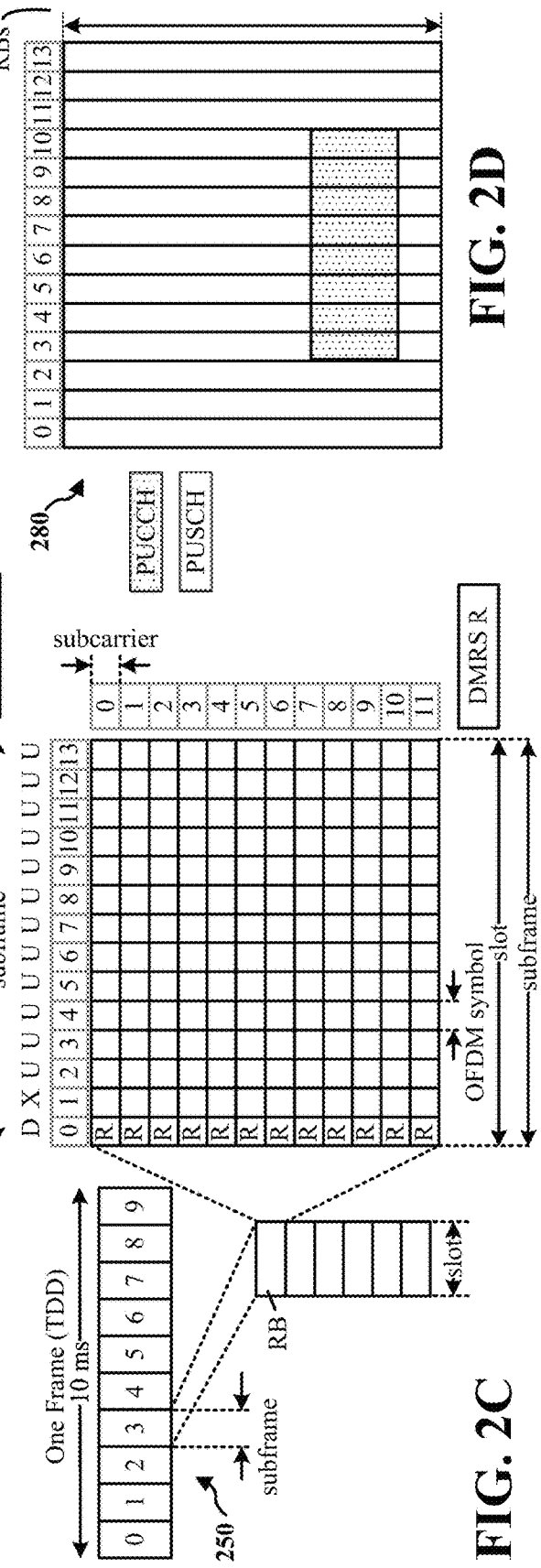
FIG. 2A  FIG. 2B  FIG. 2C  FIG. 2D

TECHNIQUES FOR SIDELINK CARRIER AGGREGATION (CA) AND CROSS-CARRIER SCHEDULING INDICATION IN SIDELINK CONTROL INFORMATION (SCI)

CROSS-REFERENCE TO RELATED APPLICATION(S)

This application claims the benefit of U.S. Provisional Patent Application No. 63/065,962, entitled "TECHNIQUES FOR SIDELINK CARRIER AGGREGATION (CA) AND CROSS-CARRIER SCHEDULING INDICATION IN SIDELINK CONTROL INFORMATION (SCI)" and filed on Aug. 14, 2020, which is expressly incorporated by reference herein in its entirety.

TECHNICAL FIELD

The present disclosure relates generally to communication systems, and more particularly, to sidelink carrier aggregation (CA) and cross-carrier scheduling indication in sidelink control information (SCI).

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some wireless communication networks include device-to-device (D2D) communication such as, but not limited to, vehicle-based communication devices that can communicate from vehicle-to-vehicle (V2V), vehicle-to-infrastructure (V2I) (e.g., from the vehicle-based communication device to road infrastructure nodes), vehicle-to-network (V2N) (e.g., from the vehicle-based communication device to one or more network nodes, such as a base station), a combination thereof and/or with other devices, which can be collectively referred to as vehicle-to-anything (V2X) communications. Further improvements in multiple-access and D2D technologies are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication at a transmitter, including configuring, for transmission to a receiver, a multi-component carrier grant including a plurality of component carriers for a physical sidelink share channel (PSSCH). The method may further include transmitting, one or both of a set of first sidelink control information (SCI) each including a single component carrier grant corresponding to one component carrier from the multi-component carrier grant and associated with scheduling information of the one component carrier, or a second SCI including the multi-component carrier grant and associated with scheduling information of the plurality of component carriers.

A further example of the subject matter described in this disclosure can be implemented at an apparatus for wireless communications including a memory storing instructions and at least one processor. The at least one processor may be configured to execute the instructions to configure, for transmission to a receiver, a multi-component carrier grant including a plurality of component carriers for a PSSCH. The at least one processor may further be configured to execute the instructions to transmit, one or both of a set of first SCI each including a single component carrier grant corresponding to one component carrier from the multi-component carrier grant and associated with scheduling information of the one component carrier, or a second SCI including the multi-component carrier grant and associated with scheduling information of the plurality of component carriers.

An additional example of the subject matter described in this disclosure can be implemented at an apparatus for wireless communications including means for configuring, for transmission to a receiver, a multi-component carrier grant including a plurality of component carriers for a PSSCH. The apparatus may further include means for transmitting, one or both of a set of first SCI each including a single component carrier grant corresponding to one component carrier from the multi-component carrier grant and associated with scheduling information of the one component carrier, or a second SCI including the multi-component carrier grant and associated with scheduling information of the plurality of component carriers.

A further example of the subject matter described in this disclosure can be implemented at a computer-readable medium storing computer executable code, the code when executed by a processor cause the processor to configure, for transmission to a receiver, a multi-component carrier grant including a plurality of component carriers for a PSSCH. The processor may further execute the executable code to transmit, one or both of a set of first SCI each including a single component carrier grant corresponding to one component carrier from the multi-component carrier grant and associated with scheduling information of the one component carrier, or a second SCI including the multi-component carrier grant and associated with scheduling information of the plurality of component carriers.

In a further example, the present disclosure provides a method of wireless communication at a receiver, including transmitting UE capability information indicating cross-carrier scheduling capability. The method may further include receiving one or both of a set of first SCI each including a single component carrier grant corresponding to one component carrier from a multi-component carrier grant and associated with scheduling information of the one component carrier, or a second SCI including the multi-component carrier grant and associated with scheduling information of a plurality of component carriers.

A further example of the subject matter described in this disclosure can be implemented at an apparatus for wireless communications including a memory storing instructions and at least one processor configured to execute the instructions. The at least one processor may be configured execute the instructions to transmit UE capability information indicating cross-carrier scheduling capability. The at least one processor may further be configured to execute the instructions to receive one or both of a set of first SCI each including a single component carrier grant corresponding to one component carrier from a multi-component carrier grant and associated with scheduling information of the one component carrier, or a second SCI including the multi-component carrier grant and associated with scheduling information of a plurality of component carriers.

An additional example of the subject matter described in this disclosure can be implemented at an apparatus for wireless communications including means for transmitting UE capability information indicating cross-carrier scheduling capability. The apparatus may further include means for receiving one or both of a set of first SCI each including a single component carrier grant corresponding to one component carrier from a multi-component carrier grant and associated with scheduling information of the one component carrier, or a second SCI including the multi-component carrier grant and associated with scheduling information of a plurality of component carriers.

A further example of the subject matter described in this disclosure can be implemented at a computer-readable medium storing computer executable code, the code when executed by a processor cause the processor to transmit UE capability information indicating cross-carrier scheduling capability. The processor may further execute the executable code to receive one or both of a set of first SCI each including a single component carrier grant corresponding to one component carrier from a multi-component carrier grant and associated with scheduling information of the one component carrier, or a second SCI including the multi-component carrier grant and associated with scheduling information of a plurality of component carriers.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A, is a diagram of an example of a first 5G/NR frame, for use in communications between two of the communicating nodes in the system of FIG. 1.

FIG. 2B, is a diagram of an example of downlink channels within a 5G/NR subframe, for use in communications between two of the communicating nodes in the system of FIG. 1.

FIG. 2C is a diagram of an example of a second 5G/NR frame, for use in communications between two of the communicating nodes in the system of FIG. 1.

FIG. 2D is a diagram of an example of uplink channels within a 5G/NR subframe for use in communications between two of the communicating nodes in the system of FIG. 1.

DETAILED DESCRIPTION

Figure 1:
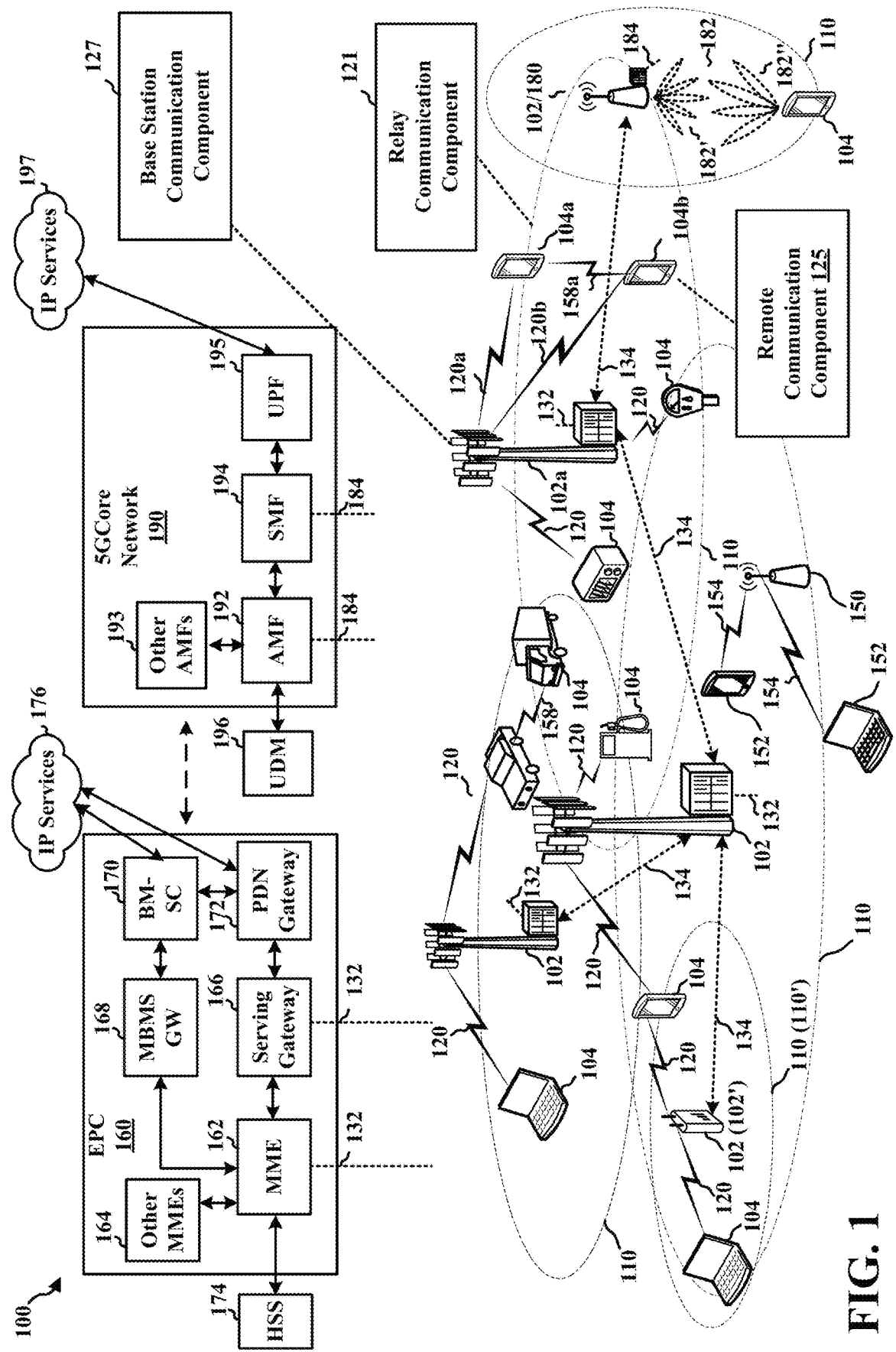
FIG. 1 is a schematic diagram of an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to sidelink communications, which includes a relay user equipment (UE) relaying communications from a base station over a sidelink to a remote UE, or from the remote UE to the base station via the relay UE. The sidelink may include a physical sidelink shared channel (PSSCH) and a physical sidelink control channel (PSCCH). The PSSCH may carry sidelink data between the UEs. Sidelink transmission may be defined as a one-to-many scheme, meaning that the data may be received by multiple UEs that belong to a group. The PSCCH may carry the sidelink control information (SCI), which may include information about the resource allocation of the PSSCH.

Specifically, the present disclosure relates to enhancements to the sidelink communications, and in particular, to cross-carrier scheduling indication in SCI. In device-todevice (D2D) communication systems operating according to a New Radio (NR) scheme, which may include a relay UE in communication with both a network entity and a remote UE, carrier aggregation may be implemented on a sidelink between the relay UE and the remote UE. That is, the carriers forming the PSSCH and/or PSCCH may be aggregated to increase the overall transmission bandwidth and, consequently, the achievable data rates on the aforementioned communication channels (e.g., PSSCH and PSCCH). Each aggregated carrier may correspond to a CC. Further, each CC may be of a certain bandwidth and may not exceed a maximum number of aggregated carriers. Although carrier aggregation may be useful in high data rate applications in D2D communication systems, an implementation of carrier aggregation may result in an increased complexity.

As such, the present disclosure mitigates the implementation complexity UEs during sidelink carrier aggregation by providing techniques for cross-carrier scheduling that permit various types of UEs within a communication network to effectively read a carrier indicator field (CIF). The CIF, which may be transmitted in sidelink control information (SCI), may indicate on which carrier a scheduled resource is located. Accordingly, to ensure UEs can effectively read CIF for multiple CC scheduling (e.g., one or more CCs), a transmit UE may send a first SCI in each of the CCs such that each first SCI indicates the resource scheduling information in the CC in which the first SCI is transmitted. That is, each first SCI may be associated with a PSSCH in the same CC as the first SCI. The transmit UE may also send a second SCI in one CC that may or may not be one of the multiple CCs indicating the resource scheduling information in all the CCs of the multiple CCs. In other words, the second SCI may be associated with a PSSCH in all the CCs. Likewise, a receiver UE may receive the information transmitted by the transmit UE in a similar manner.

These and other features of the present disclosure are discussed in detail below with regard to FIGS. 1-11.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, a relay UE 104a may include a relay communication component 121 for assisting with sidelink relay communications between a base station 102a and a remote UE 104b. The relay UE 104a may have a first access link 120a directly with the base station 102a, and a second communication link with the remote UE 104b, which may have a second access link 120b to the base station 102a. The relay communication component 121 may be configured to support cross-carrier scheduling.

Additionally, a remote UE 104b may include a remote communication component 125 for assisting with sidelink relay communication with the relay UE 104a. The remote UE 104b may have sidelink access 158a and in some aspect, an access link 120b to the base station 102a. The remote communication component 125 may be configured to support cross-carrier scheduling. Similarly, the base station 102a may include a base station communication component 127 configured to communicate with the UEs and support cross-carrier scheduling.

Further details of these cross-carrier scheduling techniques performed by the relay UE 104a, the remote UE 104b, and/or the base station 102a are discussed in more detail below.

The base stations 102, including base station 102a, may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5G core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104, including relay UE 104b and sidelink-assisted multi-link UE 104a. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120, including access links 120a and 120b, between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104, such as relay UE 104b and sidelink-assisted multi-link UE 104a, may communicate with each other using device-to-device (D2D) communication link 158, one example of which includes sidelink 158a. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D include diagrams of example frame structures and resources that may be utilized in communications between the base stations 102, the UEs 104 described in this disclosure for facilitating cross-carrier scheduling. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
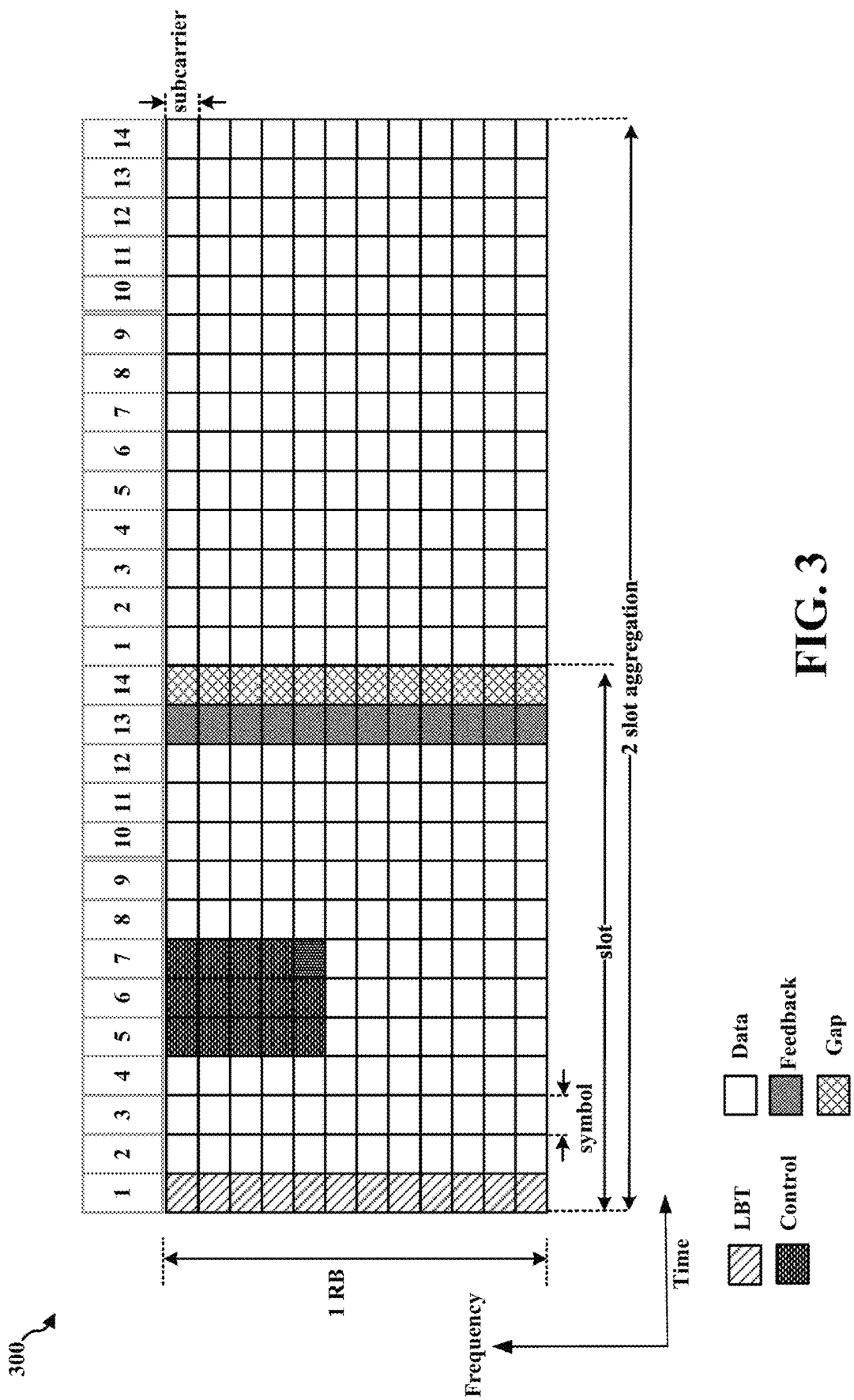
FIG. 3 is a diagram of an example frame structure and resources for sidelink communications between two of the communicating nodes in the system of FIG. 1.

FIG. 3 is a diagram 300 of an example of a slot structure that may be used within a 5G/NR frame structure, e.g., for sidelink communication including cross-carrier scheduling. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. Some of the REs may comprise control information, e.g., along with demodulation RS (DM-RS). The control information may comprise Sidelink Control Information (SCI). In some implementations, at least one symbol at the beginning of a slot may be used by a transmitting device to perform a Listen Before Talk (LBT) operation prior to transmitting. In some implementations, at least one symbol may be used for feedback, as described herein. In some implementations, another symbol, e.g., at the end of the slot, may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 3. In some implementations, multiple slots may be aggregated together, and the example aggregation of two slots in FIG. 3 should not be considered limiting, as the aggregated number of slots may also be larger than two. When slots are aggregated, the symbols used for feedback and/or a gap symbol may be different that for a single slot.

Figure 4:
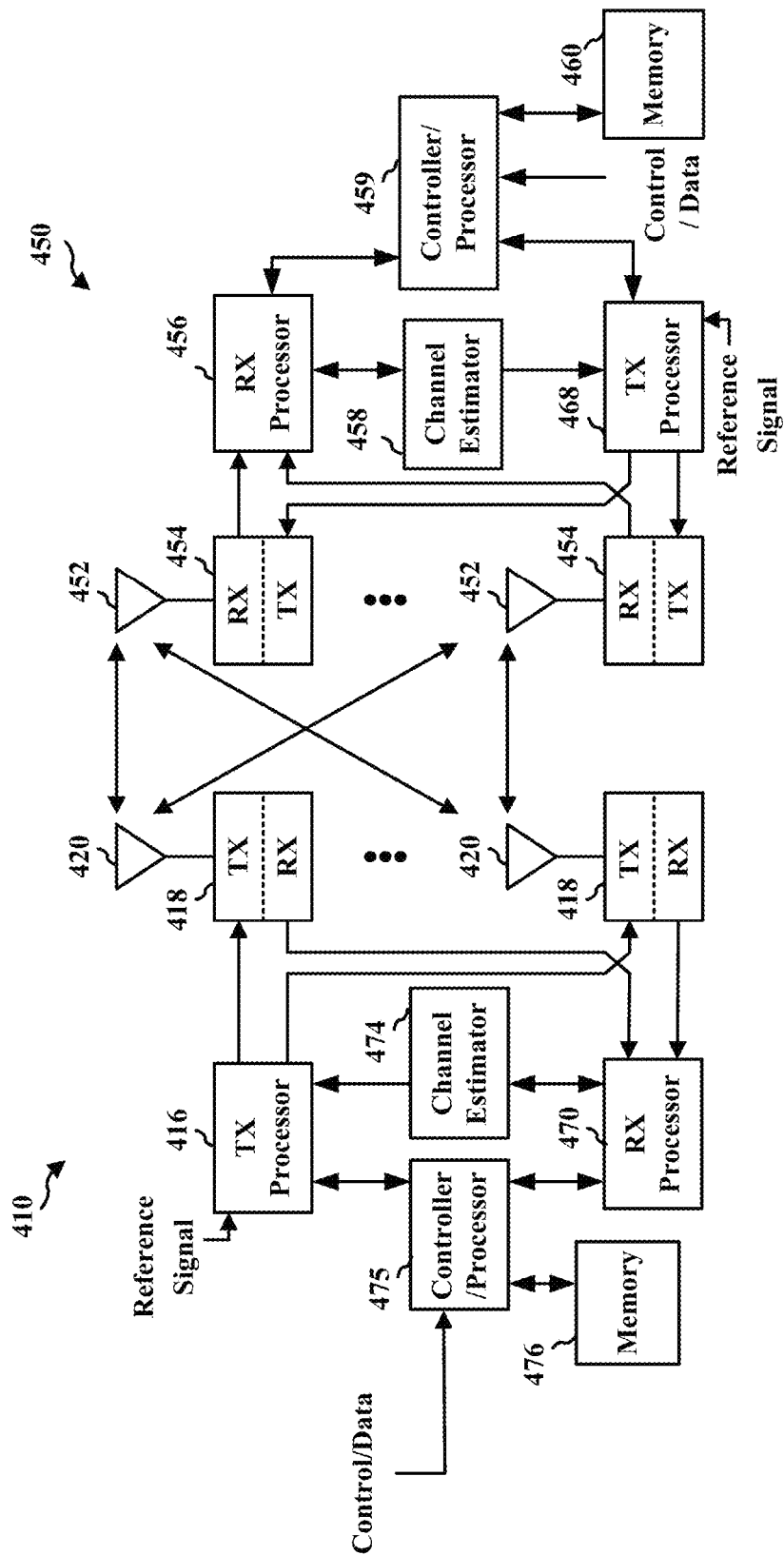
FIG. 4 is a schematic diagram of an example of hardware components of two of the communicating nodes in the system of FIG. 1.

FIG. 4 is a diagram of hardware components of an example transmitting and/or receiving (TX/RX) nodes 410 and 450, which may be any combinations of base station 102-UE 104 communications, and/or UE 104-UE 104 communications in system 100 supporting cross-carrier scheduling. For example, such communications may including, but are not limited to, communications such as a base station 102 transmitting to a relay UE 104a, a relay UE transmitting to a remote UE 104b, a remote UE 104b transmitting to a relay UE 104a, or a relay UE 104a transmitting to a base station 102 in an access network. In one specific example, the TX/RX node 410 may be an example implementation of base station 102 and where TX/RX node 450 may be an example implementation of UE 104. In the DL, IP packets from the EPC 160 may be provided to a controller/processor 475. The controller/processor 475 implements layer 4 and layer 2 functionality. Layer 4 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the tx/rx node 450. Each spatial stream may then be provided to a different antenna 420 via a separate transmitter 418TX. Each transmitter 418TX may modulate an RF carrier with a respective spatial stream for transmission.

At the TX/RX node 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the TX/RX node 450. If multiple spatial streams are destined for the TX/RX node 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the TX/RX node 410. These soft decisions may be based on channel estimates computed by the channel estimator 458. The soft decisions are then decoded and deinterleaved to recover the data and control signals that were originally transmitted by the TX/RX node 410 on the physical channel. The data and control signals are then provided to the controller/processor 459, which implements layer 4 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the TX/RX node 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the TX/RX node 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the TX/RX node 410 in a manner similar to that described in connection with the receiver function at the TX/RX node 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the tx/rx node 450. IP packets from the controller/processor 475 may be provided to the EPC 160. The controller/processor 475 is also responsible for error detection using an ACK and/or NACK protocol to support HARQ operations.

In an implementation, at least one of the TX processor 468, the RX processor 456, and the controller/processor 459 may be configured to perform aspects in connection with components 121, 125, and/or 127 of FIG. 1.

In an implementation, at least one of the TX processor 416, the RX processor 470, and the controller/processor 475 may be configured to perform aspects in connection with components 121, 125, and/or 127 of FIG. 1.

Figure 5:
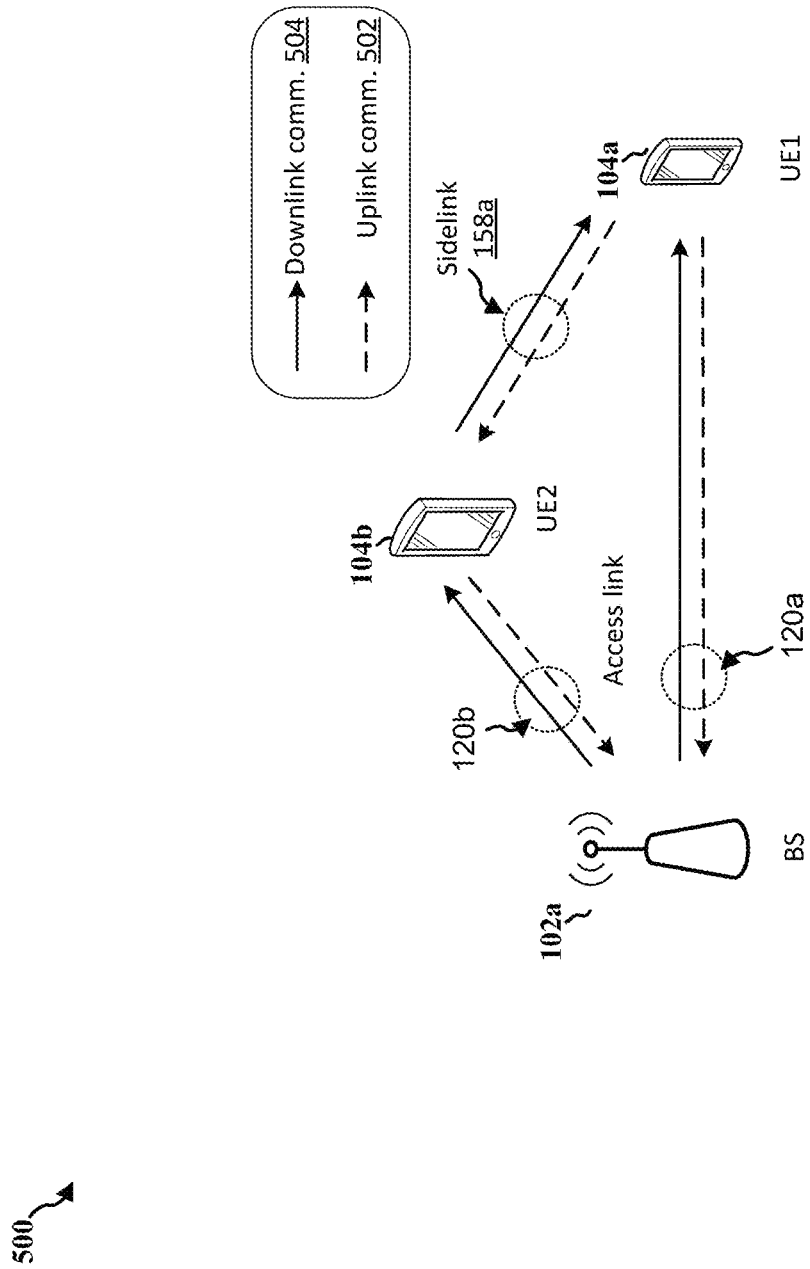
FIG. 5 is a schematic diagram of an example of a sidelink relay communication configuration operable in the system of FIG. 1.
Figure 6:
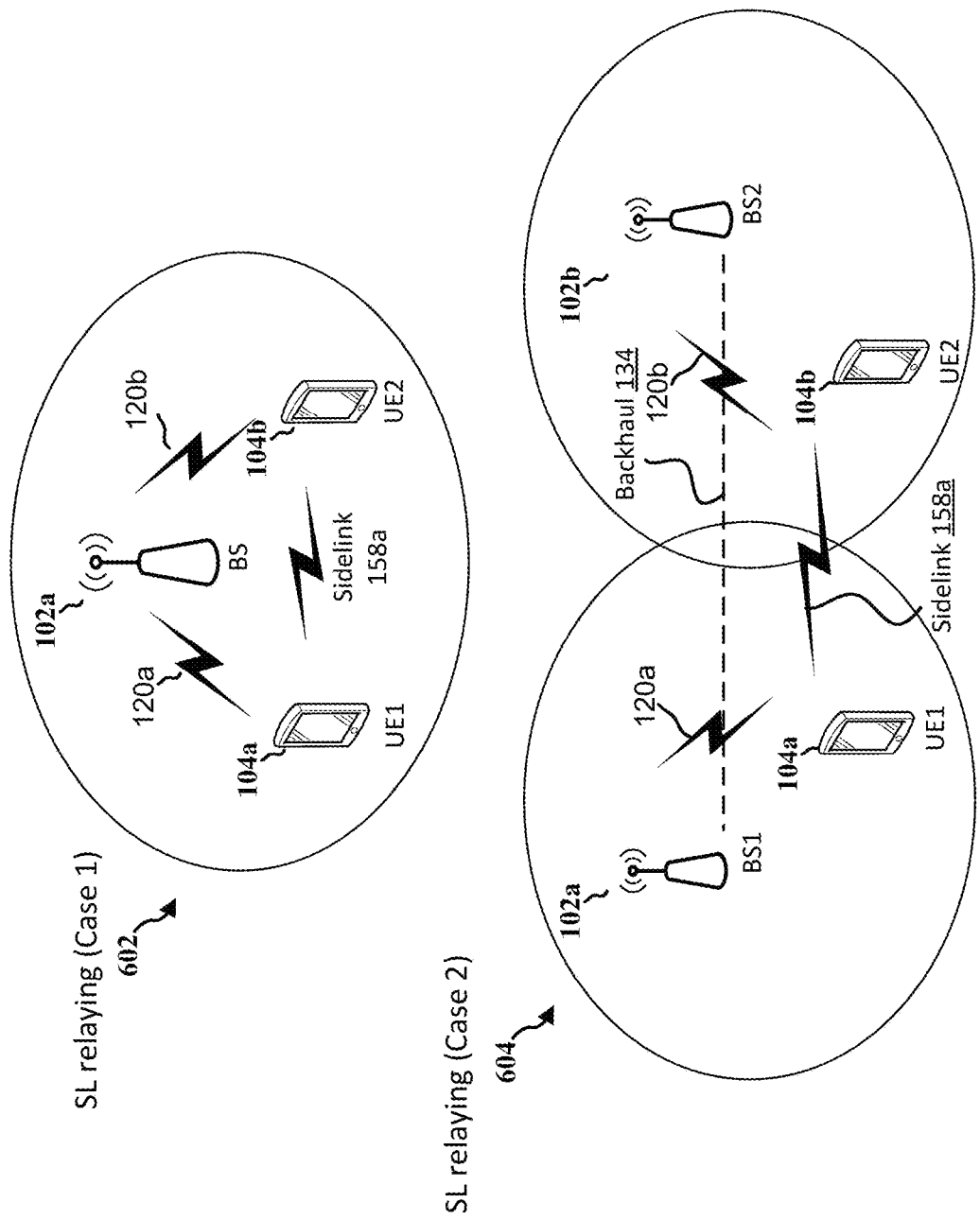
FIG. 6 is a schematic diagram of two different examples of a sidelink relay communication configuration operable in the system of FIG. 1.

Referring to FIGS. 5 and 6, sidelink relay communication scenario 500, 602, and/or 604 include relaying communications over a sidelink. As mentioned above, sidelink communication generally includes any type of D2D communication. D2D communications may be used in applications such as, but not limited to, vehicle-to-anything (V2X) or vehicle to any other device type of communications, sensor networks, public safety-related communication services with limited infrastructure availability, or any other such type of application.

In the sidelink relay communication scenario 500, 602, and/or 604, a relay UE 104a may establish a multi-link communication with one or more base stations 102a and/or 102b over two or more communication links, which include at least one direct link and at least one indirect link via a sidelink with a remote UE 104b. In a first case, such as in the sidelink relay communication scenarios 500 and 602, the sidelink-relay UE 104a directly communicates with the base station 102a via a first access link (AL) 120a, and indirectly communicates with the base station 102a via a sidelink 158a with the remote UE 104b, which has a second access link 120b with the base station 102a.

In general, an access link such as access link 120a or 120b is a communication link between a respective UE and a respective base station (or gNB), which may also be referred to as a Uu interface in 4G LTE and/or in 5G NR technologies. In general, the sidelink 158a is a communication link between UEs, which may be referred to as a PC5 interface in 4G LTE and/or in 5G NR technologies. In any case, the sidelink relay communication scenario 500, 602, and/or 604 may be utilized for improved diversity, e.g., sending the same data over two links (access link and sidelink), and/or improved throughput, e.g., sending different, independent data over each link. In an implementation, in a mmW system, this type of multi-link communication may be attained using multiple transmit/receive beams and multiple antenna panels (sub-arrays) between the UEs and/or between a respective UE and a respective base station/gNB.

Further, in a second case, such as in the sidelink relay communication scenario 604, the relay UE 104a may establish multiple links with multiple base stations 102a and 102b, which may be referred to as a multi-transmit-receive point (multi-TRP) architecture. In this case, the relay UE 104a directly communicates with the base station 102a via a first access link (AL) 120a, and indirectly communicates with the base station 102b via a sidelink 158a with the remote UE 104b, which has a second access link 120b with the base station 102b. Additionally, in this case, the base stations 102a and 102b may exchange communications over a backhaul link 134a.

Additionally, in the sidelink relay communication scenario 500, 602, and/or 604, the communications exchanged between the base station 102a/102b, relay UE 104a, and remote UE 104b may be uplink (UL) communications 502 and/or downlink (DL) communications 504 (see FIG. 5).

Cross-carrier scheduling is, in general, a method of scheduling a data transmission in a first component carrier with a scheduling control signal that is sent in a component carrier that is from the first component carrier. For example, a first UE may transmit a sidelink scheduling control signal PSCCH to a receiving second UE in a first CC that schedules a data transmission PSSCH in a second CC. The advantage of cross-carrier scheduling is that it allows the network nodes to do multi-carrier data transmission using just one scheduling control signal. As an example, the first UE may transmit one sidelink scheduling control signal PSCCH in a first CC that schedules PSSCH in a first CC and second CC.

However, in the current sidelink implementation, there may be no way to indicate the CC of the scheduled data transmission that is different from the CC in which the scheduling control signal is transmitted. That is, it may be assumed in the current sidelink implementation that the data transmission and the corresponding scheduling control signal are in the same component carrier. In some implementations, there are two forms of sidelink control indicators that may be used to schedule sidelink data transmissions.

The first SCI (e.g., SCI1) may include one or more of a three bit priority, a time domain resource allocation (TDRA) and/or frequency domain resource allocation (FDRA), a resource reservation period, a demodulation reference signal (DMRS) pattern and/or a corresponding number of ports, a second SCI (e.g., SCI2) format and/or beta factor, and a modulation and coding scheme (MCS).

The second SCI (e.g., SCI2) may include one or more of a hybrid automatic repeat request (HARQ) process identifier (ProcessID), a new data indicator (NDI), a redundancy value (RV), a source identifier (SourceID), which may be 8 bits, a destination identifier (DestID), which may be 16 bits, a channel state information (CSI) request, and a zone identifier (ZoneID) and communication range (for type1 groupcast).

In order to facilitate cross-carrier scheduling in sidelink in a sidelink implementation, extended forms of SCI may be introduced that include a carrier indication field (CIF). The CIF may be in either of the extended first SCI (e.g., SCI1) or the extended second SCI (e.g., SCI2). However, extended SCIs may not be understood by the devices that are made before the introduction of the new SCIs. One way to ensure that the such devices are still usable and the rollout of extended SCIs is to ban the use of these devices in the new frequency bands (FR 2/2x/4). This way, only the devices with extended SCIs can be used in the new frequency bands and those devices can perform multi carrier cross-carrier scheduling.

Another solution to the aforementioned problem of existing UEs not being able to read the extended SCIs may be to transmit both the current SCIs and the extended SCIs. An example of such solution: suppose the new SCI1 contains a CIF. UE1 may want to do cross-carrier scheduling to UE2 such that scheduling control signal may be in CC1 and the corresponding data transmission in CC2. UE1 may then send a extended SCI1 in CC1 and a current SCI1 in CC2. The extended SCI1 may be readable by UE2, and the current SCI1 may be readable by any UEs in the vicinity. As a further example, consider that UE1 may want to do multi-carrier cross-carrier scheduling to UE2 such that multi-carrier scheduling control signal is in CC1 (using extended SCI1) and the corresponding data transmissions in CC2 and CC3. The UE1 may send an extended SCI1 in CC1 along with two additional SCI1s in the current form in CC2 and CC3. The benefit of extended SCI1 is that the UE2, the target receiver, does not have to monitor for two legacy SCI1s in CC2 and CC3, and instead the UE2 can monitor for a single extended SCI1 in CC1.

The purpose of the two additional SCI1 in the current form may be to indicate to any UEs part of a first set of UEs with reduced or different capabilities to a second set of UEs in the vicinity that the resources indicated by the two SCI1s in CC2 and CC3 may be reserved for transmissions of the data. If CC1 and CC2 are the same in the preceding example, the SCI1 of the new form and the SCI1 of the current form in CC2 may be transmitted one after the other. For such case, it may be that the some UEs may not have the capability to do transmit back-to-back two SCI1s and may not be allowed multi-carrier cross-scheduling in that case.

As described in the aforementioned paragraph, CIF may be included in the extended SCI1 such that the UE that attempting to perform multi-carrier cross-carrier scheduling may transmit both the new SCI1 and multiple SCI1s of the current form in all CCs in which the data transmissions are to occur. Another implementation may include CIF in the extended SCI2. With this implementation, the multi-carrier cross-carrier scheduling UE may still transmit multiple SCI1s of the current form in all component carriers in which the data transmissions are to occur, and in addition the UE may transmit a SCI1 of the current form in the component carrier in which the SCI2 of the new form is transmitted.

If the extended SCI1 including a multi-CC grant is to be transmitted in one component carrier of the multiple component carriers associated with the multi-CC grant, the transmitting UE may TDM the transmission of the extended SCI1 and the transmission of the SCI1 in current format in the one component carrier of the multiple component carriers associated with the multi-CC grant. For example, the transmitting UE may first transmit the extended SCI1 followed by the SCI1 in current format. Such TDMing of the extended SCI1 and the current SCI1 may be implemented when a PSCCH-to-PSSCH delay in the component carrier is greater than zero.

In a further aspect, if extended SCI2 transmitting in a first component carrier is used to scheduled PSSCH in a second component carrier, a UE that is not capable of decoding the extended SCI2 may read the SCI1 in current format associated with the extended SCI2 and may mistakenly think that the first component carrier will be used for the PSSCH transmission.

In some implementations, the SCI monitoring burden may be limited by restricting multi-carrier cross-carrier scheduling to certain CCs. The allowed CCs may be configured by a network entity.

Figure 7:
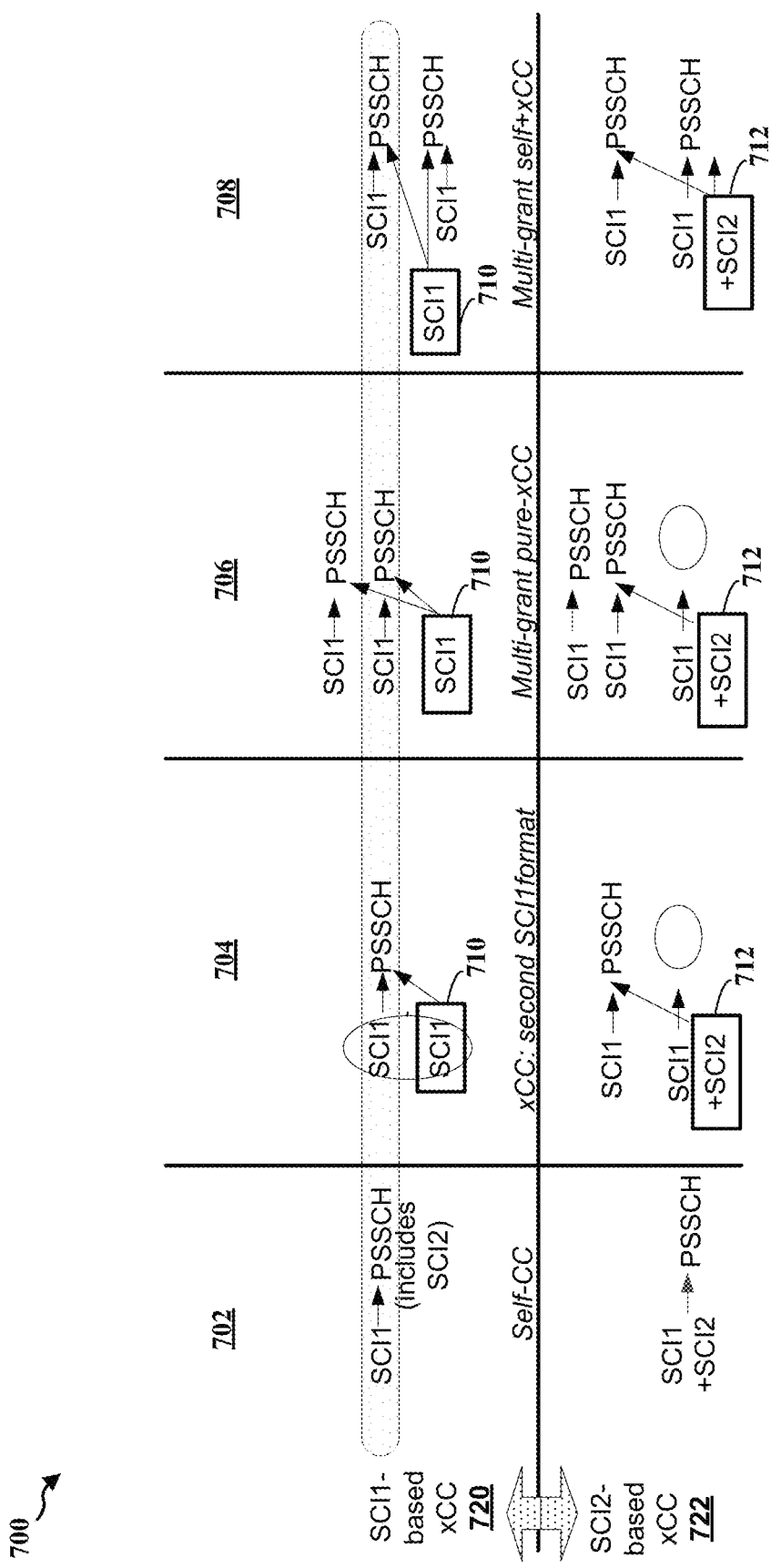
FIG. 7 is a conceptual diagram of various cross-carrier scheduling scenarios operable in the system of FIG. 1.

Referring to FIG. 7, a number of cross-carrier scheduling scenarios 700 may be implemented to permit various UE types to read CIF in SCI.

Specifically, a single grant may correspond to cross-CC grant (e.g., CC1→CC2) or same CC grant (e.g., CC1→CC1). A cross-CC grant may provide asymmetry in CCs (e.g., HetNets, licensed assisted access (LAA), network loading), thereby consolidating grants in the more reliable CC. Even without asymmetry, grant consolidation in a few CCs can limit PSCCH monitoring and save power A multi-CC grant may correspond to a multi cross-CC grant (e.g., CC1→CC2+CC3) or a same multi-CC grant (e.g., CC1→CC1+CC2).

For instance, the first scenario 702 depicts a scenario in which there is no cross carrier scheduling and both the SCI (PSCCH) and the data (PSSCH) are in the same component carrier In a second scenario 704, either the extended SCI1 710 or SCI2 712 is used for cross carrier scheduling and there is a SCI1 in the current form in the same component carrier as the PSSCH. The current SCI1 is transmitted by the transmitted UE to allow any nearby UE not capable of decoding the extended SCI1 710 or SCI2 712 be aware of the resources of the scheduled PSSCH. In a third scenario 706, either the extended SCI1 710 or SCI2 712 is used to schedule two PSSCH transmissions in two different component carrier that is different from the component carrier in which the extended SCI1 710 or SCI2 712 is transmitted. The two current SCIIs are transmitted by the transmitting UE in the component carriers in which the two PSSCH transmissions are scheduled. In a fourth scenario 708, two PSSCH transmissions are scheduled in two different component carriers, one of the component carriers is the component carrier in which the extended SCI1 710 or SCI2 712 is transmitted.

Figure 8:
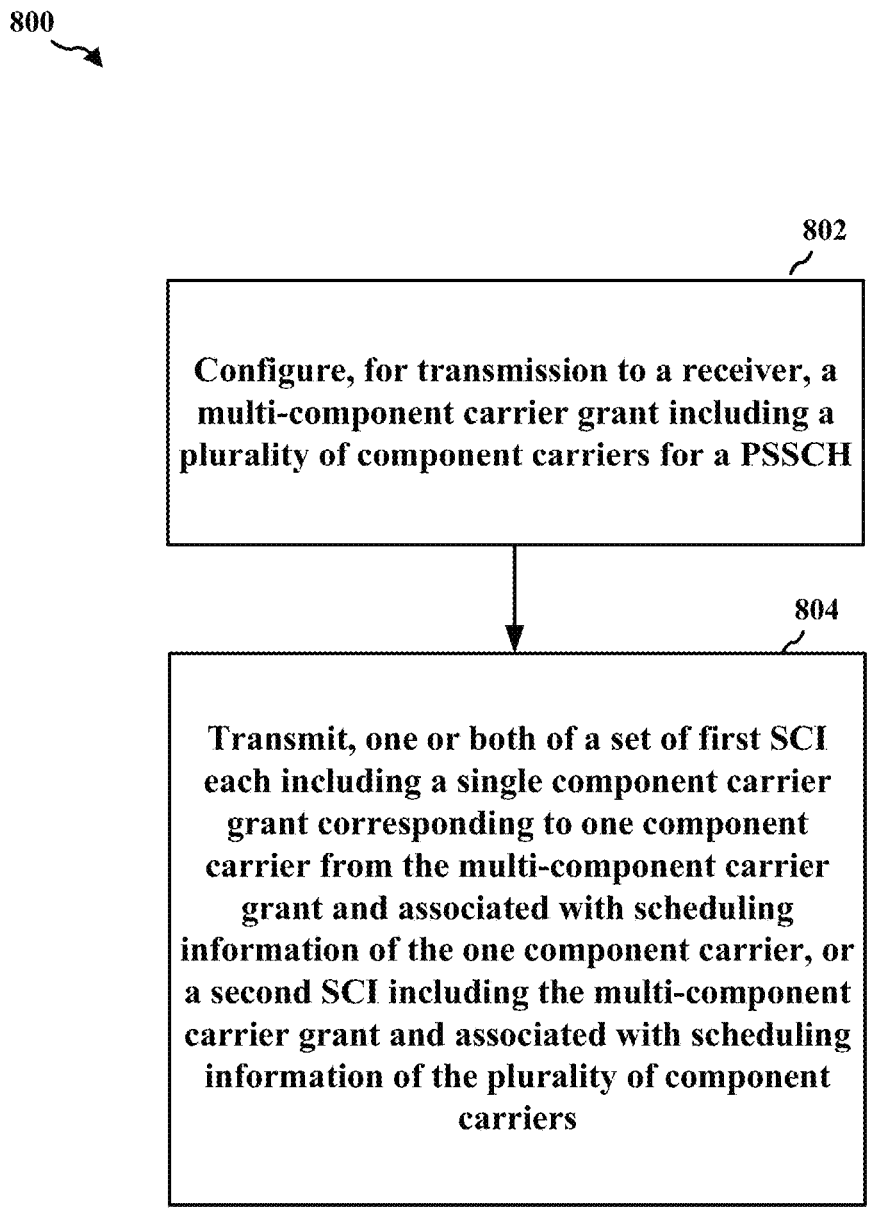
FIG. 8 is a flowchart of another example method of wireless communication at a transmitter operable in the system of FIG. 1.
Figure 10:
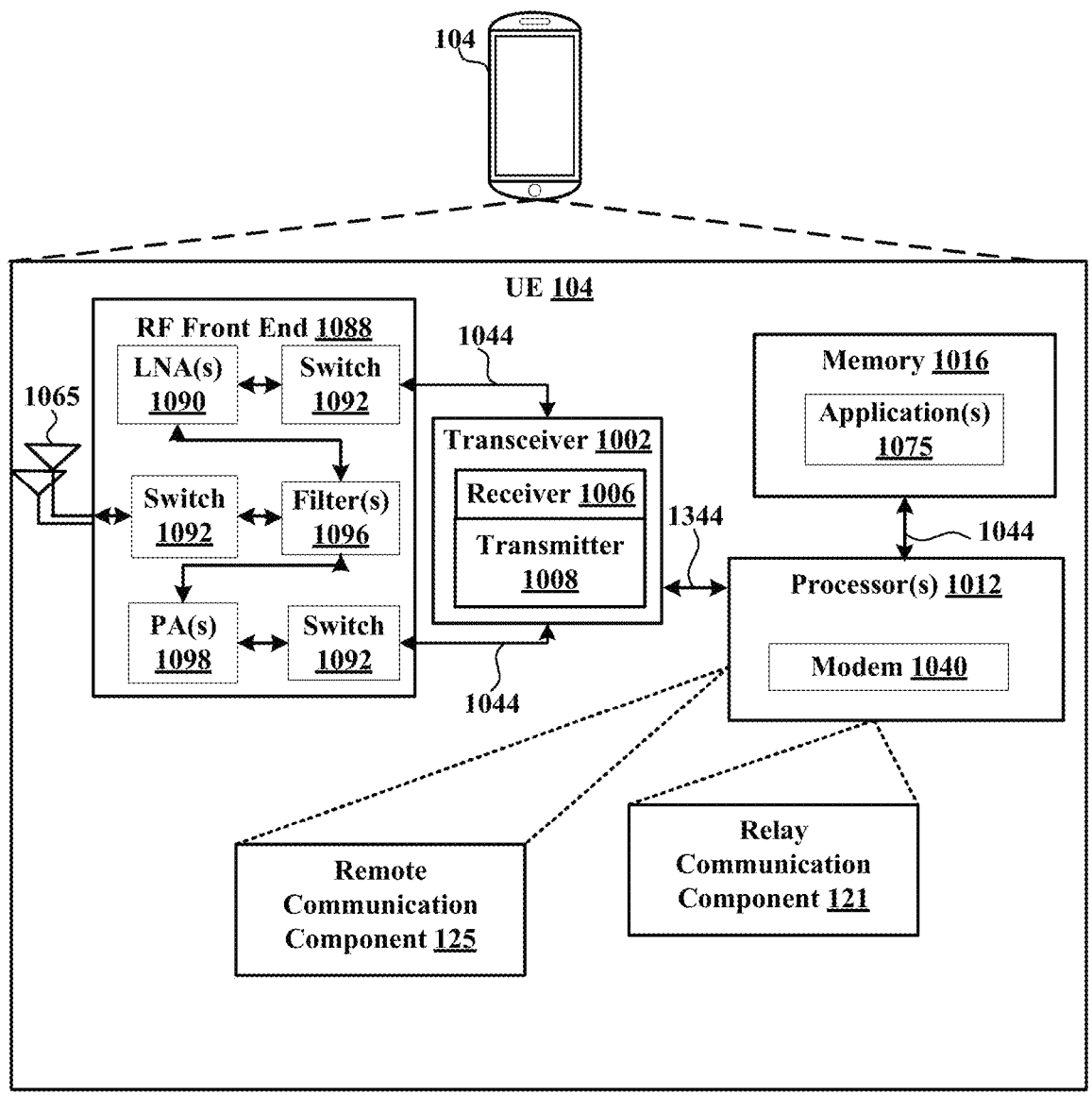
FIG. 10 is a block diagram of an example UE, in accordance with various aspects of the present disclosure.

Referring to FIG. 8, an example method 800 of wireless communication may be performed by, for example, the relay UE 104a, which may include one or more components as discussed in FIG. 1, 4, or 10, and which may operate according to the cross-carrier scheduling techniques as discussed above with regard to FIGS. 5-7.

At 802, method 800 includes configuring, for transmission to a receiver, a multi-component carrier grant including a plurality of component carriers for a PSSCH. For example, in an aspect, the remote UE 104b may operate one or any combination of antennas 1065, RF front end 1088, transceiver 1002, processor 1012, memory 1016, modem 1040, or relay communication component 121 to configure, for transmission to a receiver, a multi-component carrier grant including a plurality of component carriers for a PSSCH. Thus, the UE 104b, the processor(s) 1012, the communicating component 121 or one of its subcomponents may define the means for configuring, for transmission to a receiver, a multi-component carrier grant including a plurality of component carriers for a PSSCH. For instance, the processor 1012 of the relay UE 104a, in conjunction with the transceiver 1002, may configure the multi-component carrier grant including a plurality of component carriers for a PSSCH transmission to a receiver.

At 804, method 800 includes transmitting, one or both of a set of first SCI each including a single component carrier grant corresponding to one component carrier from the multi-component carrier grant and associated with scheduling information of the one component carrier, or a second SCI including the multi-component carrier grant and associated with scheduling information of the plurality of component carriers. For example, in an aspect, the remote UE 104b may operate one or any combination of transceiver 1002, processor 1012, memory 1016, modem 1040, or relay communication component 121 to transmit, one or both of a set of first SCI 710 each including a single component carrier grant corresponding to one component carrier from the multi-component carrier grant and associated with scheduling information of the one component carrier, or a second SCI 712 including the multi-component carrier grant and associated with scheduling information of the plurality of component carriers. Thus, the UE 104b, the processor(s) 1012, the communicating component 121 or one of its subcomponents may define the means for transmitting, one or both of a set of first SCI each including a single component carrier grant corresponding to one component carrier from the multi-component carrier grant and associated with scheduling information of the one component carrier, or a second SCI including the multi-component carrier grant and associated with scheduling information of the plurality of component carriers. For example, the processor 1012 of the relay UE 104a may activate the transceiver 1002 and associated RF front end 1088 components to transmit, one or both of a set of first SCI each including a single component carrier grant corresponding to one component carrier from the multi-component carrier grant and associated with scheduling information of the one component carrier, or a second SCI including the multi-component carrier grant and associated with scheduling information of the plurality of component carriers.

In some implementations, transmitting one or both of the first SCI or the second SCI may include transmitting both the set of first SCI such that each of the multi-component carriers has a first payload associated with the single component carrier grant and the second SCI having a second payload different from the first payload and associated with the multi-component carrier grant.

In some implementations, the first SCI may indicate a reservation of the resources indicated by the single component carrier grant to the first set of UEs.

In some implementations, transmitting one or both of the first SCI or the second SCI may include transmitting the first SCI in each component carrier of the multi-component carrier grant transmitting the second SCI in a component carrier different from the component carriers in the multi-component carrier grant.

In some implementations, each of the first SCI may indicate a reservation of the resources indicated in the single component carrier grant by the first set of UEs, the single component carrier grant corresponding to the first component carrier.

In some implementations, transmitting one or both of the first SCI or the second SCI may include transmitting the first SCI associated with the first set of UEs in each component carrier of the multi-component carrier grant, transmitting, the second SCI associated with the second set of UEs in one component carrier of the multi-component carrier grant, the multi-component carrier grant including a first component carrier and a second component carrier.

In some implementations, the second SCI may include the scheduling information up to a number of component carriers, or where the second SCI may include a designated component carrier from the number of component carriers that is used to schedule all transmissions in the number of component carriers.

In some implementations, the first SCI may be associated with a first SCI format and the second SCI may be associated with a second SCI format different from the first SCI format.

In some implementations, the second SCI may correspond to one of an SCI1 or SCI2.

Figure 9:
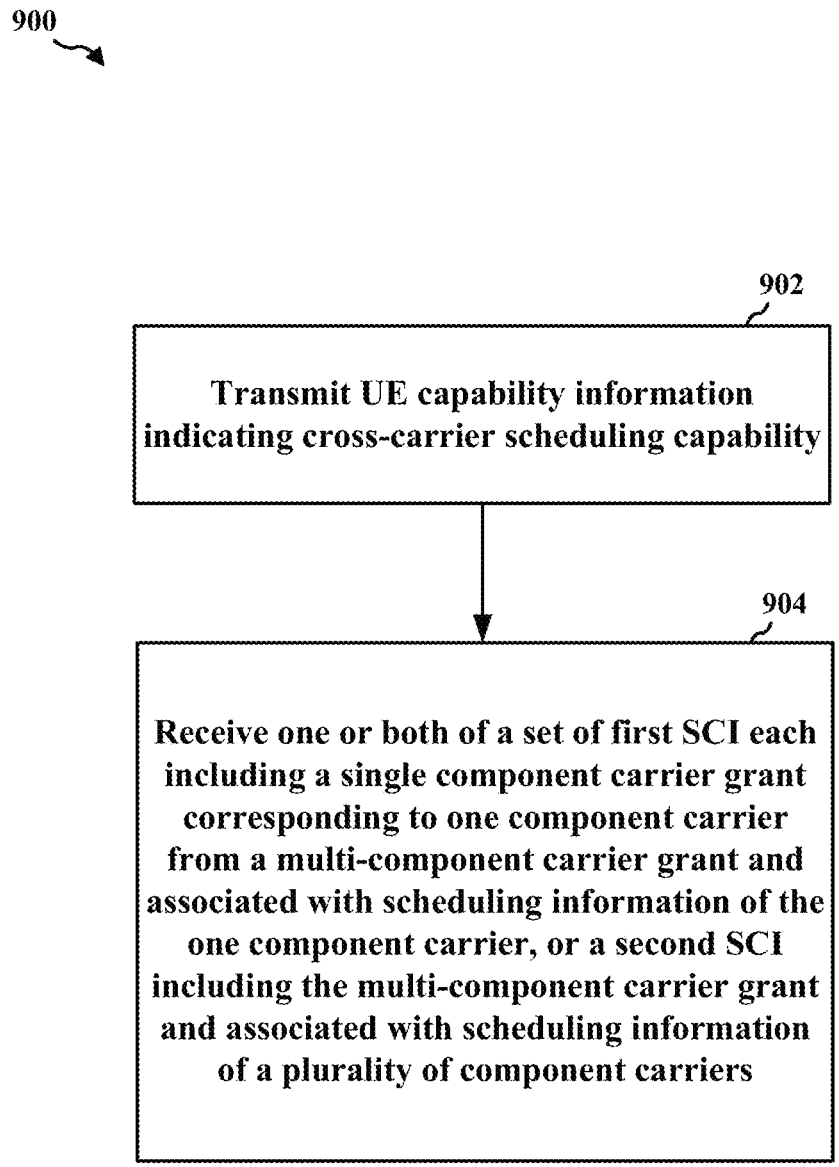
FIG. 9 is a flowchart of a method of wireless communication at a receiver operable in the system of FIG. 1.

Referring to FIG. 9, an example method 900 of wireless communication may be performed by, for example, the remote UE 104b, which may include one or more components as discussed in FIG. 1, 4, or 10, and which may operate according to the cross-carrier scheduling techniques as discussed above with regard to FIGS. 5-7.

At 802, method 800 includes transmitting UE capability information indicating cross-carrier scheduling capability. For example, in an aspect, the remote UE 104b may operate one or any combination of antennas 1065, RF front end 1088, transceiver 1002, processor 1012, memory 1016, modem 1040, or remote communication component 125 to transmit UE capability information indicating cross-carrier scheduling capability. Thus, the UE 104b, the processor(s) 1012, the communicating component 121 or one of its subcomponents may define the means for transmitting UE capability information indicating cross-carrier scheduling capability. For example, the processor 1012 of the remote UE 104b may activate the transceiver 1002 and associated RF front end 1088 components to transmit UE capability information indicating cross-carrier scheduling capability.

At 904, method 900 includes receiving one or both of a set of first SCI each including a single component carrier grant corresponding to one component carrier from a multi-component carrier grant and associated with scheduling information of the one component carrier, or a second SCI including the multi-component carrier grant and associated with scheduling information of a plurality of component carriers. For example, in an aspect, the remote UE 104b may operate one or any combination of antennas 1065, RF front end 1088, transceiver 1002, processor 1012, memory 1016, modem 1040, or remote communication component 125 to receive one or both of a set of first SCI each including a single component carrier grant corresponding to one component carrier from a multi-component carrier grant and associated with scheduling information of the one component carrier, or a second SCI including the multi-component carrier grant and associated with scheduling information of a plurality of component carriers. Thus, the UE 104b, the processor(s) 1012, the communicating component 121 or one of its subcomponents may define the means for receiving one or both of a set of first SCI each including a single component carrier grant corresponding to one component carrier from a multi-component carrier grant and associated with scheduling information of the one component carrier, or a second SCI including the multi-component carrier grant and associated with scheduling information of a plurality of component carriers. For example, the processor 1012 of the remote UE 104b may activate the transceiver 1002 and associated RF front end 1088 components to receive one or both of a set of first SCI each including a single component carrier grant corresponding to one component carrier from a multi-component carrier grant and associated with scheduling information of the one component carrier, or a second SCI including the multi-component carrier grant and associated with scheduling information of a plurality of component carriers.

In some implementations, receiving one or both of the first SCI or the second SCI may include receiving both the set of first SCI such that each of the multi-component carriers has a first payload associated with the single component carrier grant and the second SCI having a second payload different from the first payload and associated with the multi-component carrier grant.

In some implementations, the first SCI may indicate a reservation of the resources indicated by the single component carrier grant to the first set of UEs.

In some implementations, receiving one or both of the first SCI or the second SCI may include receiving the first SCI in each component carrier of the multi-component carrier grant, receiving the second SCI in a component carrier different from the component carriers in the multi-component carrier grant.

In some implementations, each of the first SCI may indicate a reservation of the resources indicated in the single component carrier grant by the first set of UEs, the single component carrier grant corresponding to the first component carrier.

In some implementations, receiving one or both of the first SCI or the second SCI may include receiving the first SCI associated with the first set of UEs in each component carrier of the multi-component carrier grant, receiving, the second SCI associated with the second set of UEs in one component carrier of the multi-component carrier grant, the multi-component carrier grant including a first component carrier and a second component carrier.

In some implementations, the first SCI may be associated with a first SCI format and the second SCI is associated with a second SCI format different from the first SCI format.

In some implementations, the second SCI may correspond to one of an SCI1 or SCI2.

Referring to FIG. 10, one example of an implementation of UE 104, including relay UE 104a and/or remote UE 104b, may include a variety of components, some of which have already been described above and are described further herein, including components such as one or more processors 1012 and memory 1016 and transceiver 1002 in communication via one or more buses 1044, which may operate in conjunction with modem 1040 and/or relay multi-CC communication component 121 and/or remote communication component 125 for facilitating cross-carrier scheduling.

In an aspect, the one or more processors 1012 can include a modem 1040 and/or can be part of the modem 1040 that uses one or more modem processors. Thus, the various functions related to relay multi-CC communication component 121 and/or remote communication component 125 may be included in modem 1040 and/or processors 1012 and, in an aspect, can be executed by a single processor, while in other aspects, different ones of the functions may be executed by a combination of two or more different processors. For example, in an aspect, the one or more processors 1012 may include any one or any combination of a modem processor, or a baseband processor, or a digital signal processor, or a transmit processor, or a receiver processor, or a transceiver processor associated with transceiver 1002. In other aspects, some of the features of the one or more processors 1012 and/or modem 1040 associated with relay multi-CC communication component 121 and/or remote communication component 125 may be performed by transceiver 1002.

Also, memory 1016 may be configured to store data used herein and/or local versions of applications 1175 or communicating component 1042 and/or one or more of its subcomponents being executed by at least one processor 1012. Memory 1016 can include any type of computer-readable medium usable by a computer or at least one processor 1012, such as random access memory (RAM), read only memory (ROM), tapes, magnetic discs, optical discs, volatile memory, non-volatile memory, and any combination thereof. In an aspect, for example, memory 1016 may be a non-transitory computer-readable storage medium that stores one or more computer-executable codes defining relay multi-CC communication component 121 and/or remote communication component 125 and/or one or more of its subcomponents, and/or data associated therewith, when UE 104 is operating at least one processor 1012 to execute relay multi-CC communication component 121 and/or remote communication component 125 and/or one or more of its subcomponents.

Transceiver 1002 may include at least one receiver 1006 and at least one transmitter 1008. Receiver 1006 may include hardware and/or software executable by a processor for receiving data, the code comprising instructions and being stored in a memory (e.g., computer-readable medium). Receiver 1006 may be, for example, a radio frequency (RF) receiver. In an aspect, receiver 1006 may receive signals transmitted by at least one base station 102. Additionally, receiver 1006 may process such received signals, and also may obtain measurements of the signals, such as, but not limited to, Ec/Io, signal-to-noise ratio (SNR), reference signal received power (RSRP), received signal strength indicator (RSSI), etc. Transmitter 1008 may include hardware and/or software executable by a processor for transmitting data, the code comprising instructions and being stored in a memory (e.g., computer-readable medium). A suitable example of transmitter 1008 may including, but is not limited to, an RF transmitter.

Moreover, in an aspect, UE 104 may include RF front end 1088, which may operate in communication with one or more antennas 1065 and transceiver 1002 for receiving and transmitting radio transmissions, for example, wireless communications transmitted by at least one base station 102 or wireless transmissions transmitted by UE 104. The one or more antennas 1065 may include one or more antenna panels and/or sub-arrays, such as may be used for beamforming. RF front end 1088 may be connected to one or more antennas 1065 and can include one or more low-noise amplifiers (LNAs) 1090, one or more switches 1092, one or more power amplifiers (PAs) 1098, and one or more filters 1096 for transmitting and receiving RF signals.

In an aspect, LNA 1090 can amplify a received signal at a desired output level. In an aspect, each LNA 1090 may have a specified minimum and maximum gain values. In an aspect, RF front end 1088 may use one or more switches 1092 to select a particular LNA 1090 and its specified gain value based on a desired gain value for a particular application.

Further, for example, one or more PA(s) 1098 may be used by RF front end 1088 to amplify a signal for an RF output at a desired output power level. In an aspect, each PA 1098 may have specified minimum and maximum gain values. In an aspect, RF front end 1088 may use one or more switches 1092 to select a particular PA 1098 and its specified gain value based on a desired gain value for a particular application.

Also, for example, one or more filters 1096 can be used by RF front end 1088 to filter a received signal to obtain an input RF signal. Similarly, in an aspect, for example, a respective filter 1096 can be used to filter an output from a respective PA 1098 to produce an output signal for transmission. In an aspect, each filter 1096 can be connected to a specific LNA 1090 and/or PA 1098. In an aspect, RF front end 1088 can use one or more switches 1092 to select a transmit or receive path using a specified filter 1096, LNA 1090, and/or PA 1098, based on a configuration as specified by transceiver 1002 and/or processor 1012.

As such, transceiver 1002 may be configured to transmit and receive wireless signals through one or more antennas 1065 via RF front end 1088. In an aspect, transceiver may be tuned to operate at specified frequencies such that UE 104 can communicate with, for example, one or more base stations 102 or one or more cells associated with one or more base stations 102. In an aspect, for example, modem 1040 can configure transceiver 1002 to operate at a specified frequency and power level based on the UE configuration of the UE 104 and the communication protocol used by modem 1040.

In an aspect, modem 1040 can be a multiband-multimode modem, which can process digital data and communicate with transceiver 1002 such that the digital data is sent and received using transceiver 1002. In an aspect, modem 1040 can be multiband and be configured to support multiple frequency bands for a specific communications protocol. In an aspect, modem 1040 can be multimode and be configured to support multiple operating networks and communications protocols. In an aspect, modem 1040 can control one or more components of UE 104 (e.g., RF front end 1088, transceiver 1002) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 1012 may correspond to one or more of the processors described in connection with the UE in FIG. 4. Similarly, the memory 1016 may correspond to the memory described in connection with the UE in FIG. 4.

Figure 11:
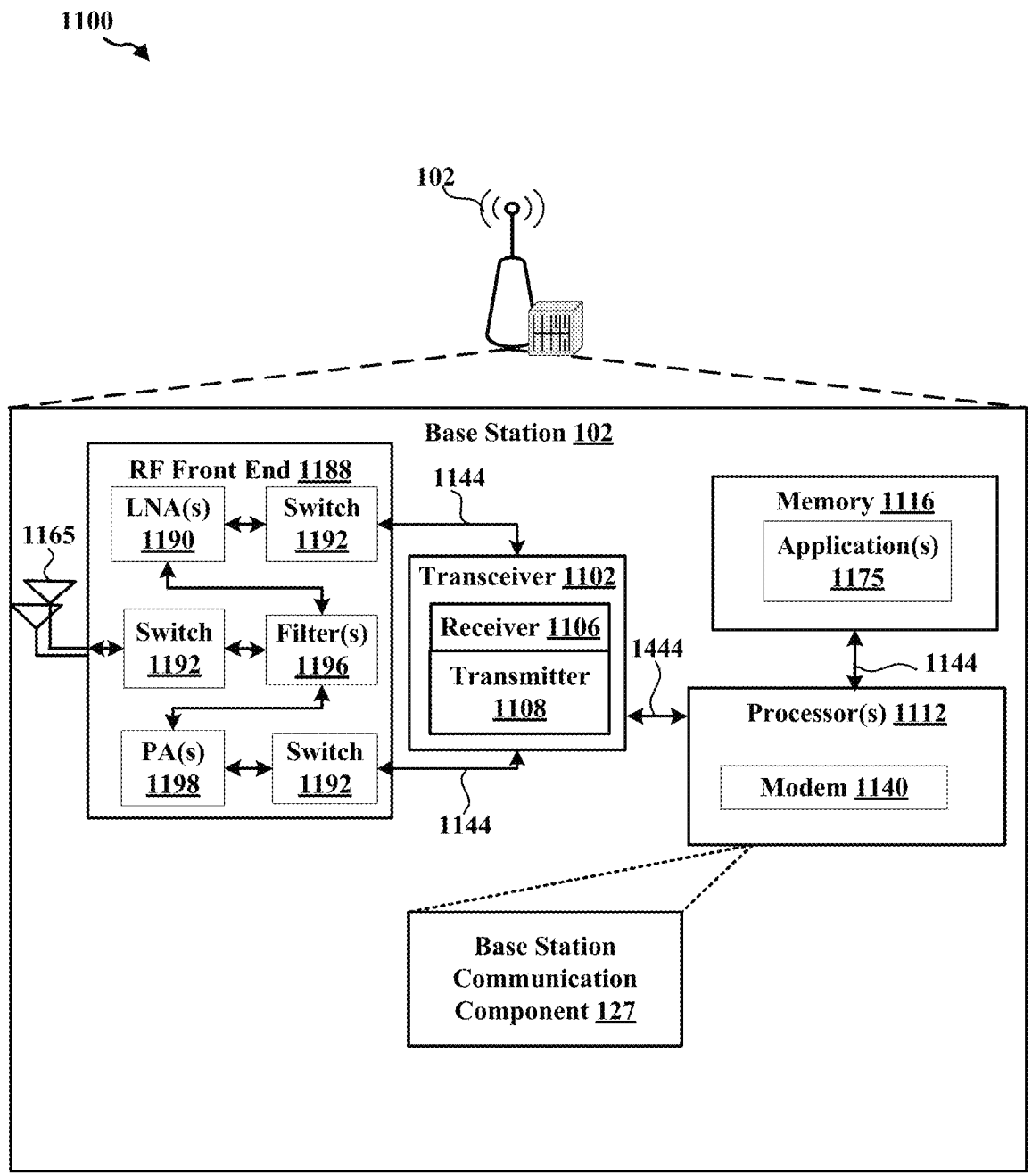
FIG. 11 is a block diagram of an example base station, in accordance with various aspects of the present disclosure.

Referring to FIG. 11, one example of an implementation of base station 102 (e.g., a base station 102, 102a, and/or 102b, as described above) may include a variety of components, some of which have already been described above, but including components such as one or more processors 1112 and memory 1116 and transceiver 1102 in communication via one or more buses 1144, which may operate in conjunction with modem 1440 and base station communication component 127 for facilitating cross-carrier scheduling.

The transceiver 1102, receiver 1106, transmitter 1108, one or more processors 1112, memory 1116, applications 1475, buses 1144, RF front end 1188, LNAs 1190, switches 1492, filters 1496, PAs 1498, and one or more antennas 1465 may be the same as or similar to the corresponding components of UE 104, as described above, but configured or otherwise programmed for base station operations as opposed to UE operations.

In an aspect, the processor(s) 1112 may correspond to one or more of the processors described in connection with the base station in FIG. 4. Similarly, the memory 1116 may correspond to the memory described in connection with the base station in FIG. 4.

Some Additional Examples

The aspects described herein additionally include one or more of the following aspect examples described in the following numbered clauses.

1. A method of wireless communication at a transmitter, comprising:
 configuring, for transmission to a receiver, a multi-component carrier grant including a plurality of component carriers for a physical sidelink share channel (PSSCH); and
 transmitting, one or both of a set of first sidelink control information (SCI) each including a single component carrier grant corresponding to one component carrier from the multi-component carrier grant and associated with scheduling information of the one component carrier, or a second SCI including the multi-component carrier grant and associated with scheduling information of the plurality of component carriers.

2. The method of clause 1, wherein transmitting one or both of the first SCI or the second SCI includes transmitting both the set of first SCI such that each of the multi-component carriers has a first payload associated with the single component carrier grant and the second SCI having a second payload different from the first payload and associated with the multi-component carrier grant.

3. The method of any preceding clause, wherein the first SCI indicates a reservation of resources indicated by the single component carrier grant to a first set of user equipments (UEs).

4. The method of any preceding clause, wherein transmitting one or both of the first SCI or the second SCI includes:
 transmitting the first SCI in each component carrier of the multi-component carrier grant; and
 transmitting the second SCI in a component carrier different from the component carriers in the multi-component carrier grant.

5. The method of any preceding clause, wherein each of the first SCI indicates a reservation of resources indicated in the single component carrier grant to the first set of user equipments (UEs), the single component carrier grant corresponding to the first component carrier.

6. The method of any preceding clause wherein transmitting one or both of the first SCI or the second SCI includes:
 transmitting the first SCI associated with a first set of user equipments (UEs) in each component carrier of the multi-component carrier grant; and transmitting the second SCI associated with a second set of UEs in one component carrier of the multi-component carrier grant, the multi-component carrier grant including a first component carrier and a second component carrier.

7. The method of any preceding clause, wherein the second SCI includes the scheduling information up to a number of component carriers, or wherein the second SCI includes a designated component carrier from the number of component carriers that is used to schedule all transmissions in the number of component carriers.

8. The method of any preceding clause, wherein the first SCI is associated with a first SCI format and the second SCI is associated with a second SCI format different from the first SCI format.

9. The method of any preceding clause, wherein the second SCI corresponds to one of an SCI1 or SCI2.

10. A method of wireless communication at a receiver, comprising:
 transmitting UE capability information indicating cross-carrier scheduling capability; and
 receiving one or both of a set of first sidelink control information (SCI) each including a single component carrier grant corresponding to one component carrier from a multi-component carrier grant and associated with scheduling information of the one component carrier, or a second SCI including the multi-component carrier grant and associated with scheduling information of a plurality of component carriers.

11. The method of any preceding clause, wherein receiving one or both of the first SCI or the second SCI includes receiving both the set of first SCI such that each of the multi-component carriers has a first payload associated with the single component carrier grant and the second SCI having a second payload different from the first payload and associated with the multi-component carrier grant.

12. The method of any preceding clause, wherein the first SCI indicates a reservation of resources indicated by the single component carrier grant to the first set of UEs.

13. The method of any preceding clause, wherein receiving one or both of the first SCI or the second SCI includes:
 receiving the first SCI in each component carrier of the multi-component carrier grant; and
 receiving the second SCI in a component carrier different from the component carriers in the multi-component carrier grant.

14. The method of any preceding clause, wherein each of the first SCI indicates a reservation of resources indicated in the single component carrier grant to the first set of UEs, the single component carrier grant corresponding to the first component carrier.

15. The method of any preceding clause, wherein receiving one or both of the first SCI or the second SCI includes:
 receiving the first SCI associated with the first set of UEs in each component carrier of the multi-component carrier grant; and
 receiving, the second SCI associated with the second set of UEs in one component carrier of the multi-component carrier grant, the multi-component carrier grant including a first component carrier and a second component carrier.

16. The method of any preceding clause, wherein the first SCI is associated with a first SCI format and the second SCI is associated with a second SCI format different from the first SCI format.

17. The method of any preceding clause, wherein the second SCI corresponds to one of an SCI1 or SCI2.

18. An apparatus for wireless communication, comprising:
 a transceiver;
 a memory configured to store instructions; and
 at least one processor communicatively coupled with the transceiver and the memory, wherein the at least one processor is configured to:
 configure, for transmission to a receiver, a multi-component carrier grant including a plurality of component carriers for a physical sidelink share channel (PSSCH); and
 transmit, one or both of a set of first sidelink control information (SCI) each including a single component carrier grant corresponding to one component carrier from the multi-component carrier grant and associated with scheduling information of the one component carrier, or a second SCI including the multi-component carrier grant and associated with scheduling information of the plurality of component carriers.

19. The apparatus of any preceding clause, wherein to transmit one or both of the first SCI or the second SCI, the at least one processor is further configured to transmit both the set of first SCI such that each of the multi-component carriers has a first payload associated with the single component carrier grant and the second SCI having a second payload different from the first payload and associated with the multi-component carrier grant.

20. The apparatus of any preceding clause, wherein the first SCI indicates a reservation of resources indicated by the single component carrier grant to a first set of user equipments (UEs).

21. The apparatus of any preceding clause, wherein to transmit one or both of the first SCI or the second SCI, the at least one processor is further configured to:
   transmit the first SCI in each component carrier of the multi-component carrier grant; and
   transmit the second SCI in a component carrier different from the component carriers in the multi-component carrier grant.

22. The apparatus of any preceding clause, wherein each of the first SCI indicates a reservation of resources indicated in the single component carrier grant to the first set of user equipments (UEs), the single component carrier grant corresponding to the first component carrier.

23. The apparatus of any preceding clause, wherein to transmit one or both of the first SCI or the second SCI, the at least one processor is further configured to:
   transmit the first SCI associated with a first set of user equipments (UEs) in each component carrier of the multi-component carrier grant; and
   transmit the second SCI associated with a second set of UEs in one component carrier of the multi-component carrier grant, the multi-component carrier grant including a first component carrier and a second component carrier.

24. The apparatus of any preceding clause, wherein the second SCI includes the scheduling information up to a number of component carriers, or wherein the second SCI includes a designated component carrier from the number of component carriers that is used to schedule all transmissions in the number of component carriers.

25. The apparatus of any preceding clause, wherein the first SCI is associated with a first SCI format and the second SCI is associated with a second SCI format different from the first SCI format.

26. An apparatus for wireless communication, comprising:
   a transceiver;
   a memory configured to store instructions; and
   at least one processor communicatively coupled with the transceiver and the memory, wherein the at least one processor is configured to:
   transmit UE capability information indicating cross-carrier scheduling capability; and
   receive one or both of a set of first sidelink control information (SCI) each including a single component carrier grant corresponding to one component carrier from a multi-component carrier grant and associated with scheduling information of the one component carrier, or a second SCI including the multi-component carrier grant and associated with scheduling information of a plurality of component carriers.

27. The apparatus of any preceding clause, wherein to receive one or both of the first SCI or the second SCI, the at least one processor is further configured to receive both the set of first SCI such that each of the multi-component carriers has a first payload associated with the single component carrier grant and the second SCI having a second payload different from the first payload and associated with the multi-component carrier grant.

28. The apparatus of any preceding clause, wherein the first SCI indicates a reservation of resources indicated by the single component carrier grant to the first set of UEs.

29. The apparatus of any preceding clause, wherein to receive one or both of the first SCI or the second SCI, the at least one processor is further configured to:
   receive the first SCI in each component carrier of the multi-component carrier grant; and
   receive the second SCI in a component carrier different from the component carriers in the multi-component carrier grant.

30. The apparatus of any preceding clause, wherein each of the first SCI indicates a reservation of resources indicated in the single component carrier grant to the first set of UEs, the single component carrier grant corresponding to the first component carrier.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a transmitting device, comprising:

configuring, for transmission to a receiver, a multi-component carrier grant including a plurality of component carriers for a physical sidelink share channel (PSSCH); and transmitting, a set of first sidelink control information (SCI) each including a single component carrier grant indicating resource scheduling information for a respective component carrier from the multi-component carrier grant such that each of the set of first SCI is associated with a PSSCH in the respective component carrier and a second SCI including the multi-component carrier grant indicating the resource scheduling information for the plurality of component carriers and associated PSSCH in all of the plurality of component carriers.

2. The method of claim 1, wherein transmitting one or both of the first SCI or the second SCI includes transmitting both the set of first SCI such that each of the first SCI has a first payload associated with the single component carrier grant and the second SCI having a second payload different from the first payload and associated with the multi-component carrier grant.

3. The method of claim 2, wherein the first SCI indicates a reservation of resources indicated by the single component carrier grant to a first set of user equipments (UEs).

4. The method of claim 1, wherein transmitting one or both of the first SCI or the second SCI includes:
    transmitting the first SCI in each component carrier of the multi-component carrier grant; and
    transmitting the second SCI in a component carrier different from the component carriers in the multi-component carrier grant.

5. The method of claim 4, wherein each of the first SCI indicates a reservation of resources indicated in the single component carrier grant to the first set of user equipments (UEs), the single component carrier grant corresponding to the first component carrier.

6. The method of claim 1, wherein transmitting one or both of the first SCI or the second SCI includes:
    transmitting the first SCI associated with a first set of user equipments (UEs) in each component carrier of the multi-component carrier grant; and
    transmitting the second SCI associated with a second set of UEs in one component carrier of the multi-component carrier grant, the multi-component carrier grant including a first component carrier and a second component carrier.

7. The method of claim 1, wherein the second SCI includes the resource scheduling information up to a number of component carriers, or wherein the second SCI includes a designated component carrier from the number of component carriers that is used to schedule all transmissions in the number of component carriers.

8. The method of claim 1, wherein the first SCI is associated with a first SCI format and the second SCI is associated with a second SCI format different from the first SCI format.

9. The method of claim 8, wherein the second SCI corresponds to one of an SCI1 or SCI2.

10. A method of wireless communication at a receiving device, comprising:
    transmitting UE capability information indicating cross-carrier scheduling capability; and
    receiving a set of first sidelink control information (SCI) each including a single component carrier grant indicating resource scheduling information for a respective component carrier from a multi-component carrier grant such that each of the set of first SCI is associated with a PSSCH in the respective component carrier and second SCI including the multi-component carrier grant indicating the resource scheduling information of a plurality for component carriers and associated PSSCH in all of the plurality of component carriers.

11. The method of claim 10, wherein receiving one or both of the first SCI or the second SCI includes receiving both the set of first SCI such that each of the multi-component carriers has a first payload associated with the single component carrier grant and the second SCI having a second payload different from the first payload and associated with the multi-component carrier grant.

12. The method of claim 11, wherein the first SCI indicates a reservation of resources indicated by the single component carrier grant to a first set of UEs.

13. The method of claim 10, wherein receiving one or both of the first SCI or the second SCI includes:
    receiving the first SCI in each component carrier of the multi-component carrier grant; and
    receiving the second SCI in a component carrier different from the component carriers in the multi-component carrier grant.

14. The method of claim 13, wherein each of the first SCI indicates a reservation of resources indicated in the single component carrier grant to a first set of UEs, the single component carrier grant corresponding to the first component carrier.

15. The method of claim 10, wherein receiving one or both of the first SCI or the second SCI includes:
    receiving the first SCI associated with a first set of UEs in each component carrier of the multi-component carrier grant; and
    receiving, the second SCI associated with a second set of UEs in one component carrier of the multi-component carrier grant, the multi-component carrier grant including a first component carrier and a second component carrier.

16. The method of claim 10, wherein the first SCI is associated with a first SCI format and the second SCI is associated with a second SCI format different from the first SCI format.

17. The method of claim 16, wherein the second SCI corresponds to one of an SCI1 or SCI2.

18. An apparatus for wireless communication, comprising:
    a transceiver;
    a memory configured to store instructions; and
    at least one processor communicatively coupled with the transceiver and the memory, wherein the at least one processor is configured to execute the stored instructions to:
        configure, for transmission to a receiver, a multi-component carrier grant including a plurality of component carriers for a physical sidelink share channel (PSSCH); and
        transmit, one or both of a set of first sidelink control information (SCI) each including a single component carrier grant indicating resource scheduling information for corresponding to one a respective component carrier from the multi-component carrier grant and associated with scheduling information of the one component carrier such that each of the set of first SCI is associated with a PSSCH in the respective component carrier, or and a second SCI including the multi-component carrier grant and associated with indicating the resource scheduling information of for the plurality of component carriers and associated PSSCH in all of the plurality of component carriers.

19. The apparatus of claim 18, wherein to transmit one or both of the first SCI or the second SCI, the at least one processor is further configured to transmit both the set of first SCI such that each of the multi-component carriers has a first payload associated with the single component carrier grant and the second SCI having a second payload different from the first payload and associated with the multi-component carrier grant.

20. The apparatus of claim 19, wherein the first SCI indicates a reservation of resources indicated by the single component carrier grant to a first set of user equipments (UEs).

21. The apparatus of claim 18, wherein to transmit one or both of the first SCI or the second SCI, the at least one processor is further configured to:
   transmit the first SCI in each component carrier of the multi-component carrier grant; and
   transmit the second SCI in a component carrier different from the component carriers in the multi-component carrier grant.

22. The apparatus of claim 21, wherein each of the first SCI indicates a reservation of resources indicated in the single component carrier grant to the first set of user equipments (UEs), the single component carrier grant corresponding to the first component carrier.

23. The apparatus of claim 18, wherein to transmit one or both of the first SCI or the second SCI, the at least one processor is further configured to:
   transmit the first SCI associated with a first set of user equipments (UEs) in each component carrier of the multi-component carrier grant; and
   transmit the second SCI associated with a second set of UEs in one component carrier of the multi-component carrier grant, the multi-component carrier grant including a first component carrier and a second component carrier.

24. The apparatus of claim 18, wherein the second SCI includes the resource scheduling information up to a number of component carriers, or wherein the second SCI includes a designated component carrier from the number of component carriers that is used to schedule all transmissions in the number of component carriers.

25. The apparatus of claim 18, wherein the first SCI is associated with a first SCI format and the second SCI is associated with a second SCI format different from the first SCI format.

26. An apparatus for wireless communication, comprising:
   a transceiver;
   a memory configured to store instructions; and
   at least one processor communicatively coupled with the transceiver and the memory, wherein the at least one processor is configured to execute the stored instructions to:
      transmit UE capability information indicating cross-carrier scheduling capability; and
      receive a set of first sidelink control information (SCI) each including a single component carrier grant indicating resource scheduling information for a respective component carrier from a multi-component carrier grant such that each of the set of first SCI is associated with a PSSCH in the respective component carrier and second SCI including the multi-component carrier grant indicating the resource scheduling information of a plurality for component carriers and associated PSSCH in all of the plurality of component carriers.

27. The apparatus of claim 26, wherein to receive one or both of the first SCI or the second SCI, the at least one processor is further configured to receive both the set of first SCI such that each of the multi-component carriers has a first payload associated with the single component carrier grant and the second SCI having a second payload different from the first payload and associated with the multi-component carrier grant.

28. The apparatus of claim 27, wherein the first SCI indicates a reservation of resources indicated by the single component carrier grant to the first set of UEs.

29. The apparatus of claim 26, wherein to receive one or both of the first SCI or the second SCI, the at least one processor is further configured to:
   receive the first SCI in each component carrier of the multi-component carrier grant; and
   receive the second SCI in a component carrier different from the component carriers in the multi-component carrier grant.

30. The apparatus of claim 29, wherein each of the first SCI indicates a reservation of resources indicated in the single component carrier grant to the first set of UEs, the single component carrier grant corresponding to the first component carrier.

* * * * *